F. L. ANTISELL.

APPARATUS FOR REFINING COPPER.

APPLICATION FILED APR. 3, 1908.

Reissued Sept. 14, 1909. 13,020.

WITNESSES

Allan H. Fowler.

Jno. S. Evans

INVENTOR

F. L. Antisell

By Wm. A. Megath

ATTORNEY.

UNITED STATES PATENT OFFICE.

FRANK LINDEN ANTISELL, OF NEW YORK, N. Y., ASSIGNOR OF ONE-FOURTH TO WILLIAM S. HIGGINS, OF PERTH AMBOY, NEW JERSEY.

APPARATUS FOR REFINING COPPER.

13,020. Specification of Reissued Letters Patent. Reissued Sept. 14, 1909.

Original No. 875,641, dated December 31, 1907, Serial No. 324,771. Application for reissue filed April 3, 1908. Serial No. 424,920.

*To all whom it may concern:*

Be it known that I, FRANK LINDEN ANTISELL, a citizen of the United States, and a resident of the city, county, and State of New York, have invented certain new and useful Improvements in Apparatus for Refining Copper, of which the following is a specification.

My invention relates to apparatus for the electrolytic refining of copper where an impure copper anode is suspended in an electrolyte, and deposited in an approximately pure state upon a cathode by means of an electric current.

One of the objects of my invention is to produce an apparatus to save the silver which has heretofore been carried by mechanical action to the cathode with which it is ultimately alloyed when the cathode is melted for casting. This loss is rarely less than one half ounce to the ton of copper deposited and often amounts to several ounces a ton when anodes high in silver are treated.

Another object is to provide means whereby the anode and cathode may be prevented from short circuiting one another, thereby preventing the loss of current which in some instances has heretofore amounted to several per cent. of the total current used.

Another object is to produce an apparatus whereby the anodes and cathodes may be placed close together, thereby reducing the electro-motive force required, and also enabling me to use more anodes and cathodes in a tank of given size, thereby increasing the surface of the electrodes, reducing the current density and permitting a large amount of copper to be refined in such a tank, and also permitting a cathode of greater weight and density to be produced.

Other objects will appear from the hereinafter description.

Figure 2:
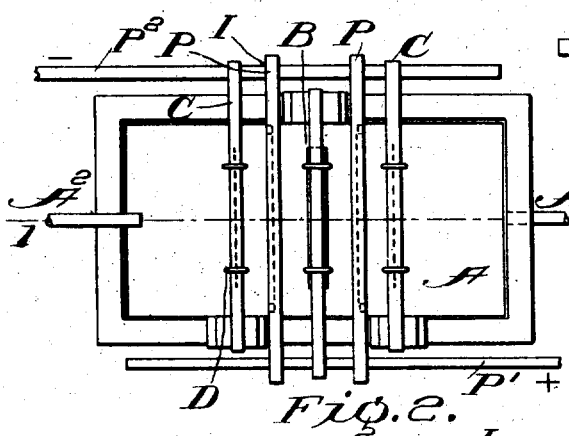
Figure 3:
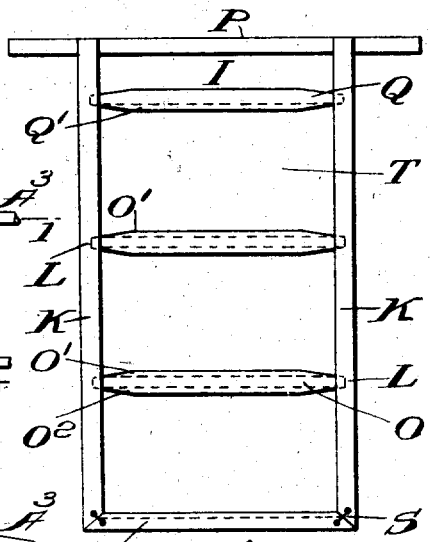
Figure 1:
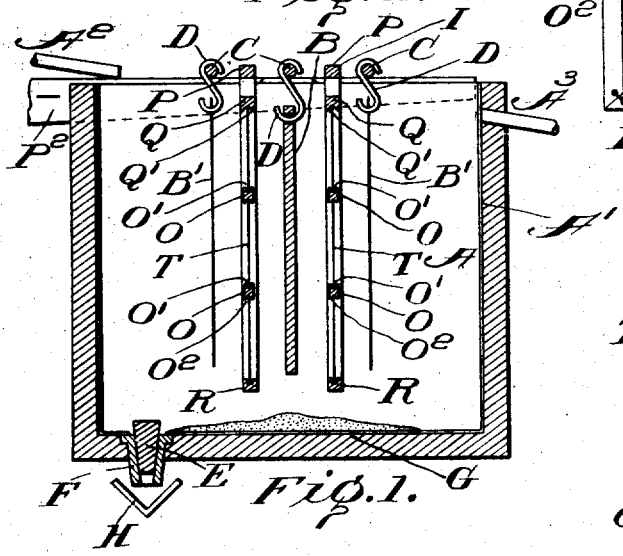
Figure 4:
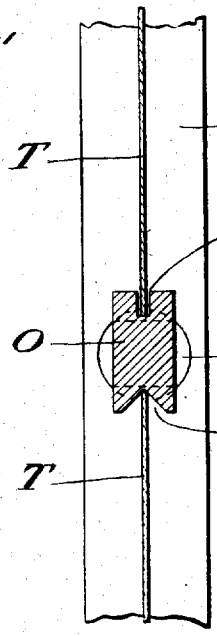
Figure 5:
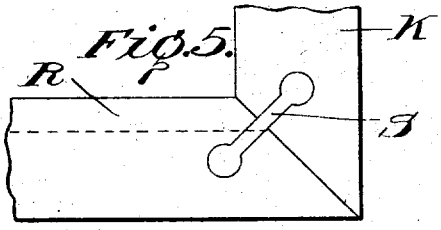

Referring to the drawing in which the same reference character indicates the same part in the several views, Figure 1 is a longitudinal section on line 1 of Fig. 2. Fig. 2 is a top plan view of the apparatus shown in Fig. 1. Fig. 3 is a front view of one of the removable porous diaphragms. Fig. 4 is a view on an enlarged scale, of a portion of said diaphragm. Fig. 5 is an enlarged view of one of the corners of the diaphragm.

The part marked A on the drawing represents the tank which is usually lined with lead A′ and contains an electrolyte of a fixed height.

$A^2$ is an inlet pipe through which the electrolyte is supplied to the tank, and $A^3$ is an overflow pipe from the tank. Suspended in the electrolyte by suitable means and connected to the positive pole P′ of a source of electric current, is the impure anode B. Suspended in like manner and connected to the negative pole $P^2$ of the current are sheets of practically pure copper which form the cathode B′. Both the anodes and cathodes are suspended from conducting rods C by hooks D.

E is a plug or stopper closing the opening F through which the slimes G are allowed to pass into the trough H.

The removable porous diaphragm I, which may be made of any suitable material, is suspended between the anodes and cathodes.

I will now describe my preferred construction of diaphragm, although I do not intend to confine myself to such a construction. K represents vertical wooden side pieces having openings or recesses L therein to receive hard wood pointed ends of the cross pieces O. P is a horizontal piece secured to the upper ends of the vertical side pieces K. The ends of this cross-piece P extend beyond the vertical side pieces and are used to suspend the diaphragm from the top of the tank. Q is the upper cross piece which has a V groove Q′ on the under edge thereof. The cross arms O are provided with a similar groove $O^2$ on the under edge thereof, and another groove O′ on the upper edge thereof. R is a wooden cross bar secured to the lower ends of the side pieces K. S is a piece of hard lead securing the side frames and the bottom cross bar together, forming an acid proof joint. The weight of the lead assists in keeping the diaphragm in its vertical position in the electrolyte. The open spaces between the cross pieces, the bottom piece and the side frames K are filled in or paneled with veneer T of about 1/28 of an inch in thickness. I have found that white wood rotary cut veneer forms a satisfactory material for the panels, one frame outwearing several sets of panels which may be renewed without taking the frame apart by springing in the veneer, the V grooves being provided to faciliate this operation. The panels are preferably so constructed that the grain of the veneer runs vertically. It may here be stated that by placing the V grooves on the under side of the cross bars, there is no tendency for the grooves to fill with slimes which will fall off and settle in the bottom of the tank. This construction of diaphragm is cheap and of reasonable simplicity, and the expense of making and maintaining the diaphragm is insignificant compared with the saving effected by its use. The construction of my apparatus is such that the diaphragm may be readily removed from the tank or adjusted therein and by the terms "readily removable" and "adjustable" I mean that it can be removed or adjusted without taking the tank apart, or destroying or mutilating either the anode or cathode, or any of the parts that support the same.

When the diaphragm is placed in the electrolyte it will allow the electric current to be transmitted through the electrolyte, but will not allow the fine particles of silver to be carried to the cathode by the circulating electrolyte. The circulation of the electrolyte is maintained by allowing it to discharge into the tank through the pipe $A^2$, whence it circulates through the tank and escapes by the pipe $A^3$. When the silver is liberated by the transfer of the copper cations, the silver not being deposited in the solution used—84 per cent. $H_2O$ and 12 per cent. $H_2SO_4$ and 4 per cent. copper—and having a tendency to settle, soon reaches the bottom of the tank in the form of slimes, owing to the fact that it is not allowed to lodge on the rough surface of the cathode and attach itself thereto mechanically. Although this porous diaphragm must necessarily offer additional resistance between the anode and cathode as usually placed in a refining tank, yet by reason of being able to place the anode and cathode closer together, I offset this disadvantage and effect a decided gain in two ways, first, by the direct reduced resistance and second by being able to place more cathodes and anodes in a tank of given size, thereby reducing the current density and consequently the resistance.

I desire it to be understood that the language used in the following claims is intended to cover all of the generic and specific features of the invention herein described, and all statements of the scope of the invention, which, as a matter of language, might be said to fall therebetween.

Having now described my invention, what I claim as new and desire to secure by Letters Patent is:

1. In a device for electrolytically refining copper, a tank adapted to contain an electrolyte, an anode and a cathode suspended in said electrolyte, a frame suspended in said electrolyte between the anode and the cathode, and a removable porous non-conducting diaphragm carried by said frame.

2. In a device of the class described, a diaphragm adapted to be suspended in an electrolyte, consisting of a frame and a removable wooden panel carried by said frame.

3. In a device of the class described, a diaphragm adapted to be suspended in an electrolyte, vertical side pieces, cross pieces extending from one side piece to another, and removable panels secured between the side pieces and the cross pieces, said pieces and panels being made of non-conducting material.

4. In a device of the class described, a diaphragm adapted to be suspended in an electrolyte, consisting of a frame of non-conducting material and removable wooden panels carried by said frame.

5. In a diaphragm adapted to be inserted in an electrolyte, vertical side pieces, cross pieces extending from one side to the other, said pieces being made of non-conducting material, and panels of rotary cut wood veneer secured between said side pieces and cross pieces and adapted to be removable therefrom.

6. In a diaphragm adapted to be suspended in an electrolyte, vertical side pieces, cross pieces extending from one side piece to the other, said cross pieces having grooves therein, and removable panels between the vertical pieces and cross pieces, the edges of the panels being in said grooves.

7. In a diaphragm adapted to be suspended in a tank containing an electrolyte, vertical side pieces and cross pieces connecting the upper ends of the side pieces and extending beyond said pieces and adapted to rest against the side of the tank, a bottom cross piece secured to the vertical pieces by a leaden joint, cross pieces between the vertical pieces having grooves on the top and bottom thereof, the bottom groove being V shaped, and removable panels filling the space between the vertical pieces and the cross pieces, the upper and lower edges of the panels resting in the said grooves of the cross pieces.

8. In a device for electrolytically refining metal, a tank adapted to contain an electrolyte, an anode and a cathode suspended in the electrolyte, and a sheet of rotary cut wood veneer in said electrolyte between the anode and cathode.

9. In a device for electrolytically refining metal, a tank containing an electrolyte, electrodes in the electrolyte, and a wooden diaphragm mounted in the electrolyte between the electrodes said diaphragm being laterally adjustable.

10. In a device for electrolytically refining metal, a tank containing an electrolyte, an anode and a cathode in the electrolyte, and a wooden diaphragm suspended between the anode and cathode and readily removable from the electrolyte.

11. In a device for electrolytically refining metal, a tank containing an electrolyte, an anode and a cathode in the electrolyte, and a wooden diaphragm mounted between the anode and cathode and free to move in and to be removed from the electrolyte.

12. In a device for electrolytically refining metal, a tank containing an electrolyte, an anode and a cathode in the electrolyte, and a wooden diaphragm mounted between the anode and the cathode adjustable between the same and readily removable from the electrolyte.

13. In a device for electrolytically refining metal, a tank containing an electrolyte, an anode and a cathode in the electrolyte, a fibrous diaphragm between the anode and cathode and readily removable from the electrolyte.

In testimony whereof, I have hereunto set my hand at the city, county and State of New York this 27 day of March, 1908.

FRANK LINDEN ANTISELL.

In presence of—
AGNES C. O'CONNELL,
FRANK EUFEMIA.